United States Patent [19]
Welch

[11] Patent Number: 5,899,803
[45] Date of Patent: May 4, 1999

[54] MOBILE POULTRY CARCASS COMPOSTER AND SPREADER

[76] Inventor: Joe Welch, 466 Welch Rd., Laurel, Miss. 39440

[21] Appl. No.: 08/855,193

[22] Filed: May 13, 1997

[51] Int. Cl.$^6$ ...................................................... A22B 5/00
[52] U.S. Cl. ........................ 452/198; 222/616; 435/290.3
[58] Field of Search ........................... 452/198; 366/226; 435/290.3; 241/101.742; 222/616

[56] References Cited

U.S. PATENT DOCUMENTS

| | | | |
|---|---|---|---|
| 3,035,740 | 5/1962 | Burch . | |
| 3,539,113 | 11/1970 | Tyler | 239/673 |
| 3,850,364 | 11/1974 | Robbins | 241/51 |
| 3,942,769 | 3/1976 | Whiteside et al. | 259/81 R |
| 3,951,312 | 4/1976 | Gay . | |
| 4,019,723 | 4/1977 | Urbanczyk | 259/183 |
| 4,105,412 | 8/1978 | Petzinger | 23/259.1 |
| 4,162,752 | 7/1979 | Satterfield . | |
| 5,076,504 | 12/1991 | Young | 241/92 |
| 5,206,169 | 4/1993 | Bland | 435/284 |
| 5,300,438 | 4/1994 | Augspurger et al. | 435/312 |
| 5,547,420 | 8/1996 | Stikeleather et al. | 452/138 |
| 5,589,391 | 12/1996 | Fink | 435/290.3 |

*Primary Examiner*—Willis Little
*Attorney, Agent, or Firm*—Ray F. Cox, Jr.

[57] ABSTRACT

A method of and apparatus for composting poultry carcasses, comprising a two wheel utility trailer with a rotary drum composter mounted for rotation about a horizontal axis above and parallel to the wheel axle of the trailer. The drum may be turned, manually or mechanically, until the composting process is complete. After composting, the loaded composter is taken to a field for spreading. The drum has openings which are opened and a chain drive is connected to the axle of the trailer so that the drum is turned by the movement of the wheels of the trailer over the ground. This tumbling action spreads the composted material as the trailer is pulled over the field. In one embodiment, the trailer is provided with a roof to keep rain off the composter drum. In another embodiment, the spreading action is improved by providing a distributing disc located under the trailer and driven by the drive axle to throw the composted material falling from the openings of the drum.

1 Claim, 5 Drawing Sheets

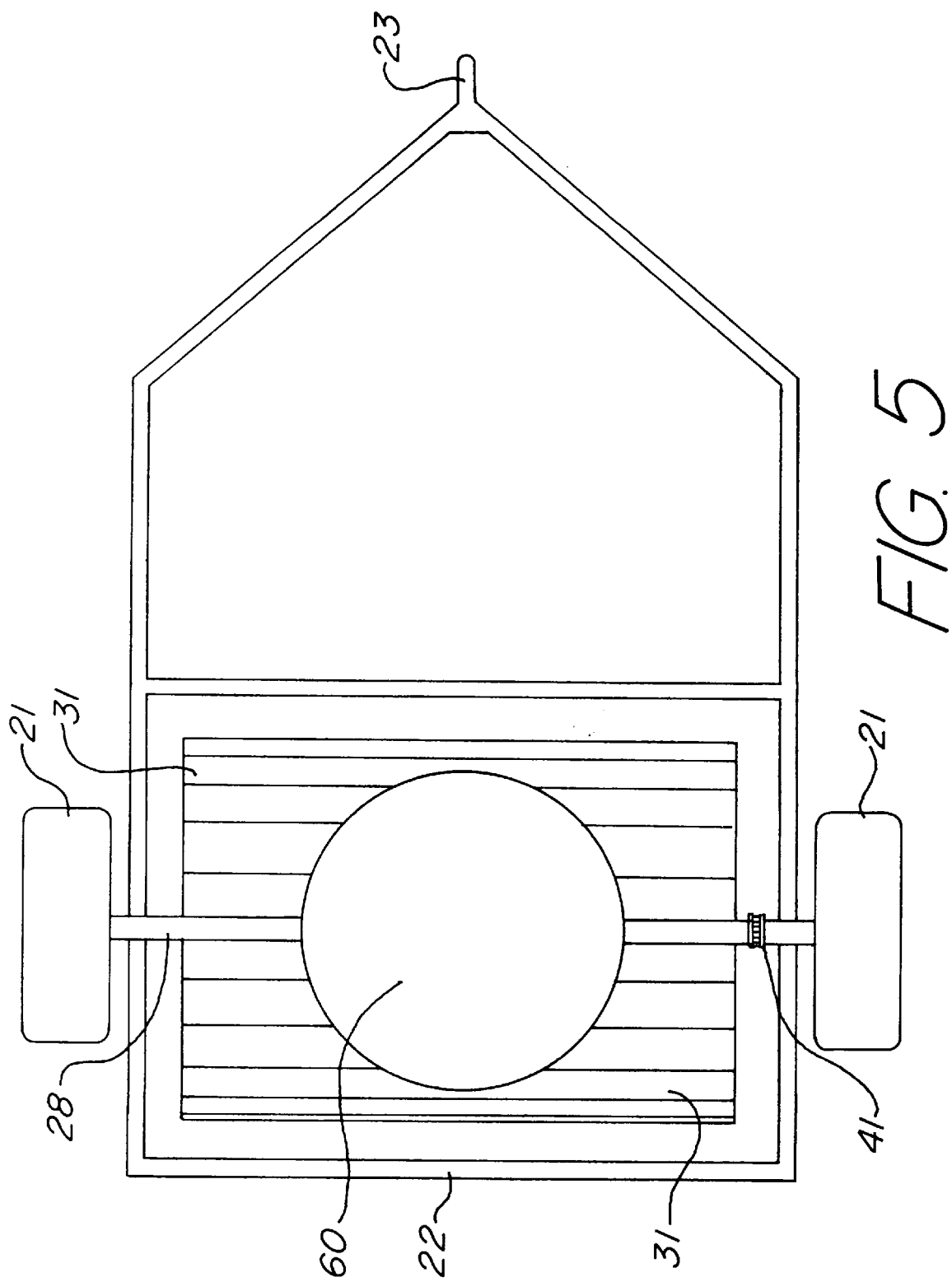

MOBILE POULTRY CARCASS COMPOSTER AND SPREADER

BACKGROUND OF THE INVENTION

The present invention relates to a device for composting organic material, such as poultry carcasses, and in particular to a device which minimizes handling operations by combining the functions of a mobile composter with a spreader for land application of composted material.

Poultry growing necessarily results in the deaths of some proportion of the birds. In a large poultry growing operation, the numbers may exceed some hundreds of birds per day on an average basis. The disposal of the carcasses presents a considerable problem to growers. One solution has been to bury the carcasses. This solution has a number of problems, not the least of which is the environmental impact. Present and anticipated environmental regulations will severely limit or curtail this practice. Alternatives to burying include incineration and composting. Incineration is costly and otherwise undesirable. Composting appears to be a practical, cost effective, and environmentally acceptable method of disposal of poultry carcasses. Composting is a well known art in which organic material is decomposed to produce an environmentally benign and useful soil amendment. Composting can destroy pathogens and is well suited to the disposal of animal carcasses.

One well known technique of composting is to place the organic material in a pile, such as a windrow, or in an enclosure with suitable amendments to enhance the natural biological processes that break the organic material down into a humus for application to the soil. It is known to use such a process for poultry carcasses. U.S. Pat. No. 5,206,169 issued to Bland on Apr. 27, 1993 discloses a compost crib for composting chicken carcasses. The apparatus of Bland is not mobile and contains no provision for spreading the composted material.

Turning the material at intervals during the composting process is well known. Horizontal rotary composting drums for this purpose are disclosed in U.S. Pat. Nos. 5,300,438; 5,589,391; and 3,942,769.

Most composters, including the rotary types, are intended to be stationarily mounted. It is known however to mount a rotary drum composter on wheels for mobile operation. U.S. Pat. No. 5,300,438 issued to Augspurger et al. discloses a horizontal rotary drum composter which may be mounted on a two wheeled trailer for mobile operation. Other patents for composters that are mobile or portable include small composters for domestic use such as Petzinger, U.S. Pat. No. 4,105,412, or composting machines designed to be employed in turning windrows of composting materials, such as Urbanczyk, U.S. Pat. No. 4,019,723. Also disclosed is a portable compost grinder, U.S. Pat. No. 3,850,364. U.S. Pat. Nos. 5,547,420 and 5,076,504 disclose mobile devices for pulverizing animal carcasses to prepare the material for composting among other purposes. Neither patent is specifically for an apparatus or method of composting.

Although horizontal rotary drum composters are suitable for composting poultry carcasses, the significant limitation to the use of composting in the disposal of poultry carcasses is not the technology of composting per se, but the material handling problem of dealing with large numbers of carcasses on a daily basis, including transferring the carcasses from poultry house to composter, transferring the composted material to a land disposal site, and finally spreading the composted material on the land disposal site. Typically, the following operations are required: poultry carcasses are collected from poultry houses and placed into some form of transport vehicle, the transport vehicle transports the poultry carcasses to a composting facility, the carcasses are loaded into the composter, and, after a suitable period of composting, the composted material is removed from the composter, loaded onto a transport vehicle, carried to a land disposal site, transferred from the transport vehicle to a mobile spreader, and the spreader then applies the composted material to the land. The large number of handling operations are inefficient and time consuming. Employing a mobile composter could alleviate some of the handling operations, although the present inventor is not aware of any suggestion in the prior art that a mobile composter would be useful in alleviating the handling problems involved in the disposal of poultry carcasses. Even the employment of a mobile composter does not alleviate all the handling problems, however, since the composted material must still be transferred from the composter to the spreader, which involves potentially two additional handling operations. To the knowledge of the present inventor, the prior art does not suggest the combination of a mobile composter with a spreader to avoid these additional handling operations.

The problems and limitations of the prior art are overcome by the present invention as summarized below.

SUMMARY OF THE INVENTION

The present invention is a mobile composter for poultry carcasses. The common practice in the industry has been to dispose of poultry carcasses by burial. New EPA regulations are expected to prohibit this practice and to require either incineration or composting before land application. Incineration is expensive and not a desirable option. Composting and land application is preferred, but it makes for multiple handling operations to dispose of the carcasses. It is typically necessary to first pick up the carcasses from the poultry houses. Next, the carcasses must be transported to distant composting facilities where the carcasses are removed from the transporting vehicle and loaded into the composting apparatus. After composting, the composted material must then be removed from the composter, transported to a site for land application, and loaded into a spreader for application to the soil. The present invention, by contrast, eliminates many of these redundant handling steps.

The present invention comprises a two wheel utility trailer with a rotary drum composter mounted for rotation on the trailer. The mobile composter is taken to the poultry houses, where the poultry carcasses are loaded into the rotary drum. This is the only manual handling operation required with the present invention. After the composter is loaded, it may be parked at any suitable location for the composting action to be completed. The drum is mounted for rotation about a horizontal axis above and parallel to the wheel axle of the trailer. During the composting process, which may take 30 days, the composter is turned, manually or mechanically, every few days until the process is complete. No motorized turning is required but may be employed as desired. After composting is complete, the loaded composter is taken to a field for spreading. At no time is there any requirement for loading or unloading the composter. The drum has openings, such as doors, which are opened. A chain drive is connected to the axle of the trailer so that the drum is turned by the movement of the wheels of the trailer over the ground. This tumbling action spreads the composted material as the trailer is pulled over the field.

The invention would be employed as follows: first the trailer would be taken to the vicinity of the poultry houses where the carcasses would be loaded into the drum. The drum would be loaded to ⅔ or ¾ full and fertilizer would be added to enhance the composting process. A full composter would be parked while the composting process took place. As described above, the drum would be rotated every few days until the composting process was completed. In order to have the capacity to keep the composting process going continually and have the capacity to continue to receive carcasses as needed, it would be desirable to have several trailers in use simultaneously at different stages of the composting process. After the completion of the composting cycle in one trailer it would be taken to a field for spreading as described above.

In one embodiment, the trailer is provided with a roof to keep rain off the composter drum.

In another embodiment, the spreading action is improved by providing rotating broadcasting means located under the trailer and driven by the drive axle to throw the composted material falling from the openings of the composting drum.

The advantages of the present invention include the avoidance of incineration and compliance with environmental regulations. Further, the present invention combines transport, composting equipment, and a spreader in one piece of equipment which eliminates the labor of multiple handling operations and the economic penalty of maintaining several separate pieces of equipment.

It is therefore an object of the present invention to provide for a method and apparatus for the mobile composting of poultry carcasses.

A further object of the present invention is to provide for a method and apparatus for the mobile composting of poultry carcasses which eliminates redundant material handling operations.

An additional object of the present invention is to provide for a method and apparatus for the mobile composting of poultry carcasses which combines material transport, composting equipment, and spreading equipment in a single device.

Further objects and advantages of the present invention will be apparent from a consideration of the following detailed description of the preferred embodiments in conjunction with the appended drawings as briefly described following.

BRIEF DESCRIPTION OF THE DRAWINGS

FIG. 5 is a bottom plan view of the embodiment of FIG. 3.

DETAILED DESCRIPTION OF THE PREFERRED EMBODIMENTS

Figure 1:
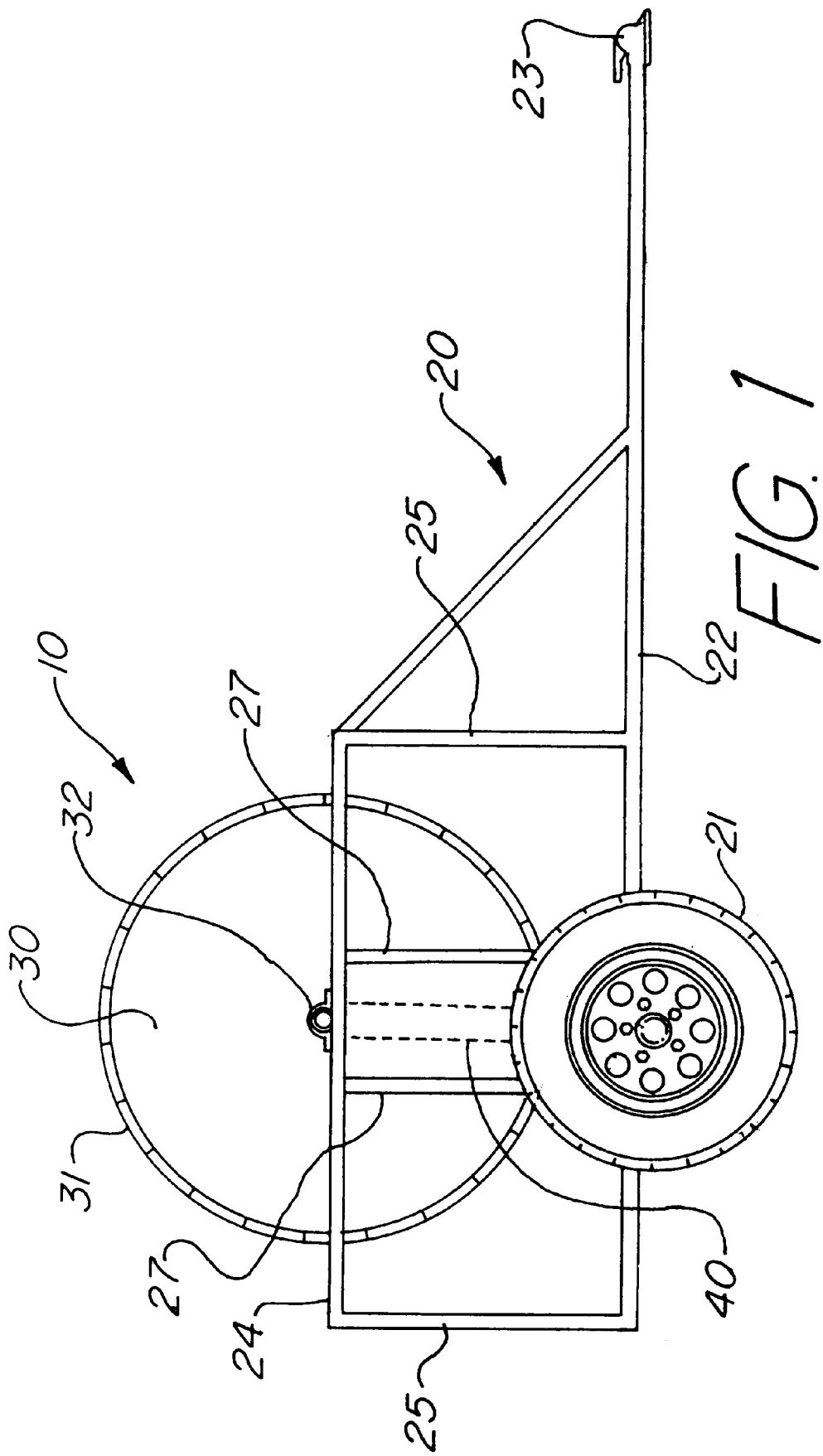
FIG. 1 is a side elevation of the present invention.

The general features of the present invention may be described with reference to FIG. 1. A rotary composting drum 10 is mounted on a utility trailer 20 for rotation about a horizontal axis. In the preferred embodiment, the utility trailer 20 comprises an open framework including a base frame 22 for attachment of the wheels 21 and terminating in a hitch 23, and a box frame 24 for supporting the rotary composting drum 10 horizontally above the base frame 22 on vertical members 25. Reinforcement of the structure may be accomplished by diagonal bracing 26 and drum axle supports 27. The utility trailer 20 may be constructed of two (2) inch steel angle for adequate strength and rigidity. It should be understood that various forms of support for the composting drum and various designs of the utility trailer other than the specific forms mentioned above would be acceptable in the practice of the present invention.

Figure 4:
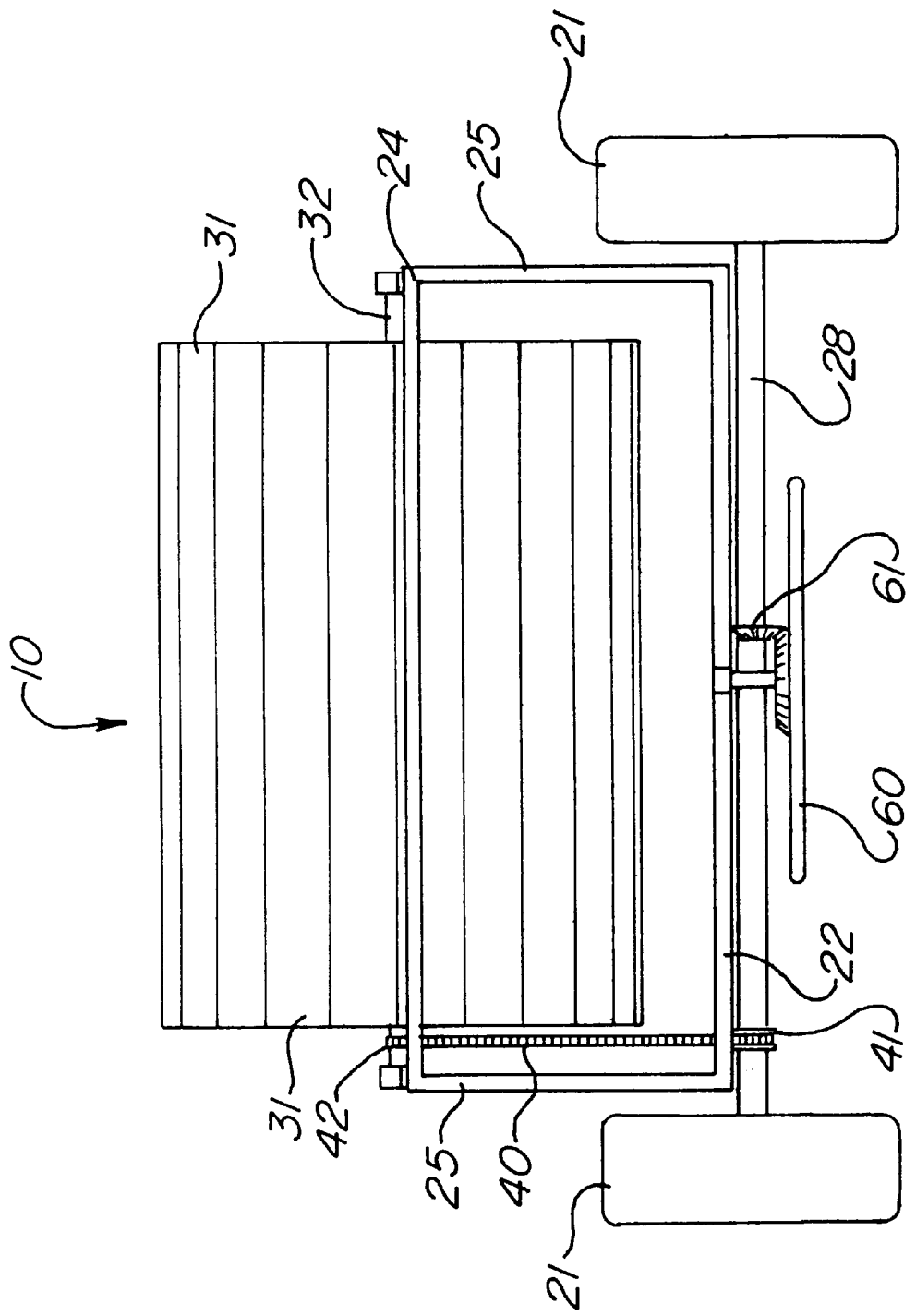
FIG. 4 is a front elevation of the embodiment of FIG. 3.

With reference to FIGS. 4 and 5, it may be seen that wheels 21 are mounted for rotation on wheel axle 28. Wheel axle 28 is mounted for rotation on base frame 22. Hitch 23 may be provided with a jack stand (not shown) in order to maintain the device in a stable level orientation when parked. Although not critical to the present invention, wheels 21 of fourteen (14) inch radius are acceptable.

Rotary composting drum 10 is advantageously comprised of a pair of circular end walls 30, which in turn are attached to a plurality of slats 31 arrayed so as to form, in cooperation with the end walls 30, a cylindrical drum-shaped side wall. The slats 31 need not be closely fitting, and in fact, should allow spaces for air circulation to promote composting activity and ensure drainage from the composting material. Alternatively, the drum 10 may be formed of molded plastic or fiberglass with openings formed therein which may be closed or opened for employment in the practice of the present invention.

Figure 3:
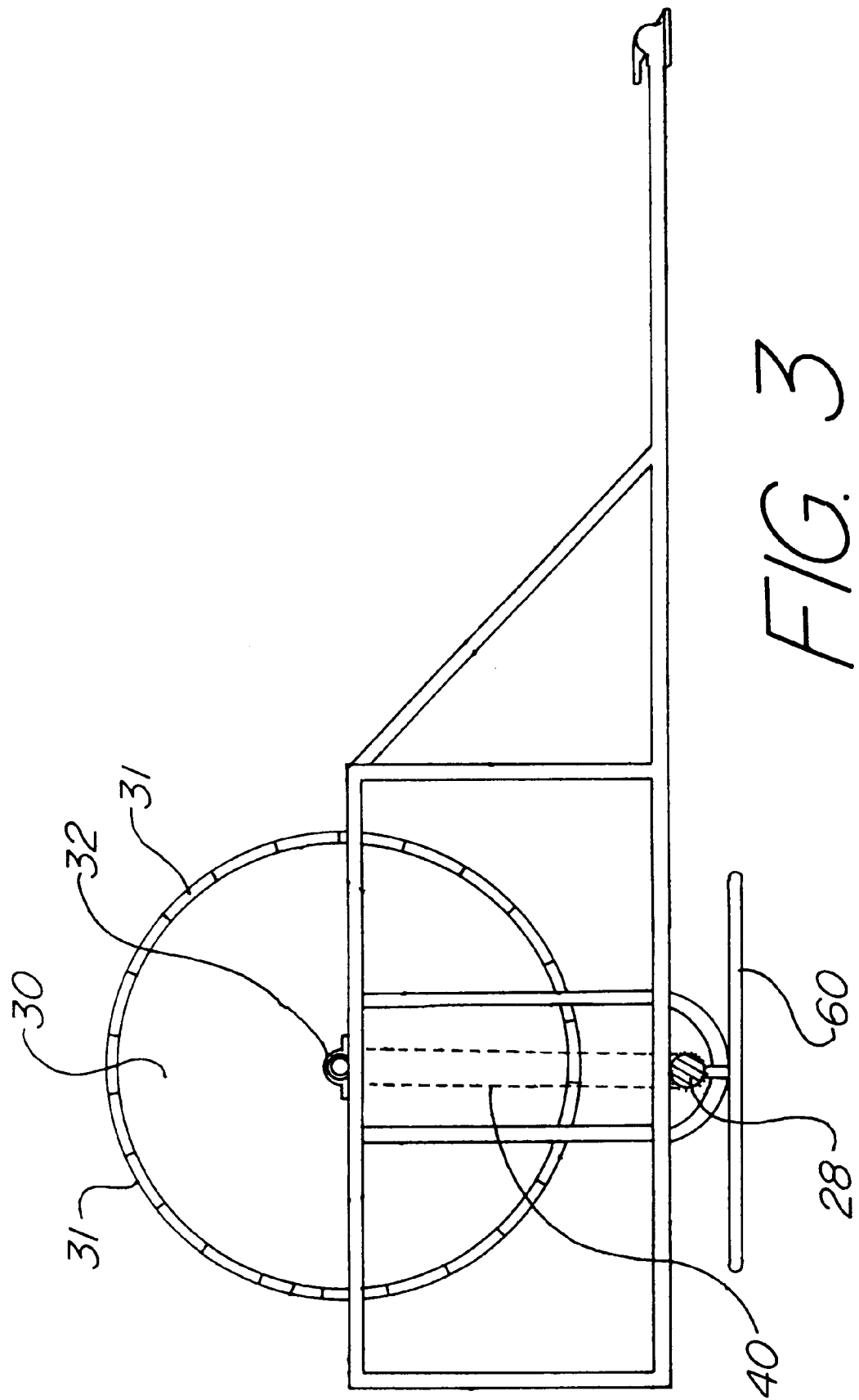
FIG. 3 is a side elevation of the embodiment of FIG. 1 of the present invention with wheels removed to illustrate a distributor disc for broadcasting composted material.

As may be seen with reference to FIGS. 1, 3, and 4, the rotary composting drum 10 is mounted on drum axle 32 which is journaled on the box frame 24 for rotation on a horizontal axis directly above and parallel to the wheel axle 28.

The slats 31 may be advantageously constructed of pressure treated ¾ inch wood, which is inexpensive, durable, and easily replaced as necessary. In the preferred embodiment, most of the slats 31 are fixed to the end walls 30, and a number of the slats 31 are removable. The removable slats may be, for example, adapted to be received in grooves in adjacent slats. Other means of achieving removable or openable slats or other openings in the exterior of the drum 10 would be within the skill and knowledge of those of ordinary skill in the art and are contemplated to be within the scope of the present invention. The purpose in employing removable or openable slats 31 will be described more fully hereinafter.

The wheel axle 28 is mechanically linked to the drum axle 32 so that rotation of the wheels 21, when the utility trailer 20 is moved over the ground, will in turn cause the rotation of the drum axle 32 and thus the rotation of the rotary composting drum 10. The mechanical linkage may be accomplished by various means that would be apparent to one of ordinary skill in the art. In the preferred embodiment, the linkage is accomplished by a link chain 40 connected between a wheel axle gear 41 and a drum axle gear 42. Although the embodiment shown in FIG. 4 illustrates only one chain 40, it may be desirable to employ two such chains, one to each side of the drum 10, so as to improve the turning of the drum. It is desirable that the mechanical linkage between the wheel axle 28 and the drum axle 32 be susceptible to disconnection at the option of the user. For example, when the composter is parked and the composter action is underway, it would be desirable for the rotary composting drum to be turned by hand or by mechanical means without requiring the utility trailer 20 to be moved. Also when the device is being transported along a road, it is desirable that the rotary composting drum 10 be disconnected from the wheel axle 28 and it may also be desirable that the rotary composting drum be locked in position to prevent unwanted tumbling action which may interfere with transport. Disconnecting the drum axle 32 from the wheel axle 28 may be accomplished by removing the link chain 40, by allowing the gears 41, 42 to be journaled about their respective axles 28, 32 when a connecting pin is removed, or by various other mechanical means well known to those of skill in the art.

Figure 2:
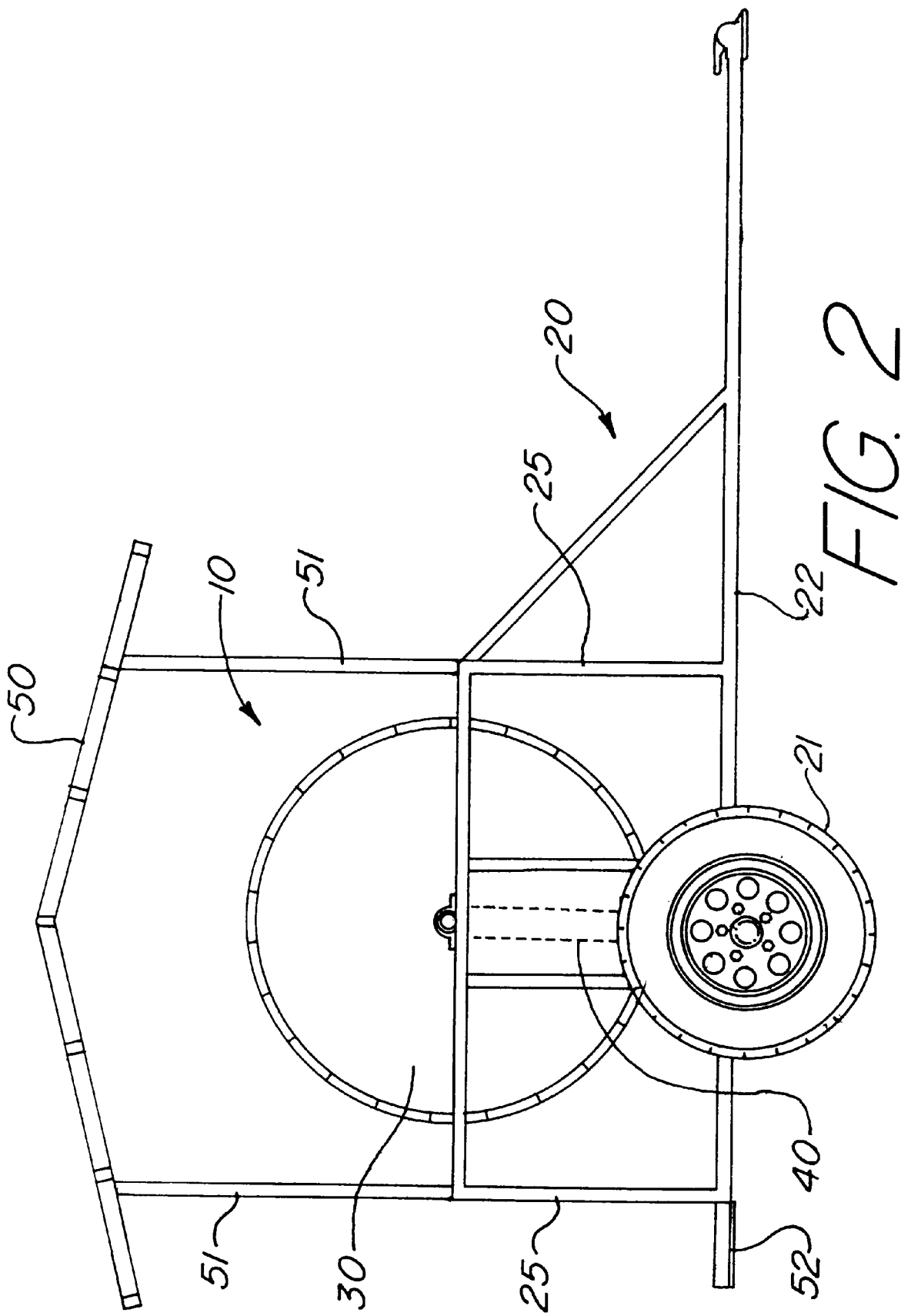
FIG. 2 is a side elevation of an alternative embodiment of the present invention which additionally includes a roof to protect the composter from the weather.

An alternative embodiment of the present invention is illustrated in FIG. 2. Composting is a biological process which requires some degree of control over the environmental conditions in order to maximize the efficiency of the process. It is well known, for example, that when the material being composted is too wet, the result may be anaerobic conditions which lead to poor composting and annoying smells. Too little moisture may also work to retard the composting process. In order to control such matters, especially when the composter is parked outdoors, it is desirable to add a roof 50 over the rotary composting drum 10 in order to prevent unwanted precipitation falling on the rotary composting drum 10. The roof 50 may be mounted on vertical extensions 51 of the vertical members 25. The roof 50 may be constructed of various types of materials, for example, commonly available ribbed roofing tin. The roof 50 may also be removable for easier and safer transport. To provide for easier access to the rotary composting drum, a step 52 may be added to the base frame 22.

A further alternative embodiment may be described with reference to FIGS. 3, 4, and 5. As will be described more fully below, once the composting action is completed, the composted material is then applied to a suitable land site. While a simple tumbling action may be sufficient to spread the composted material, additional means to assist the spreading action may be desirable. Various broadcasting means are known in the art for assisting in the broadcast spreading of materials, including fertilizer, onto land. For example, U.S. Pat. No. 3,539,113 issued to Tyler, the disclosure of which is incorporated herein by reference, discloses a broadcast fertilizer spreader utilizing rotating distributor discs to distribute fertilizer falling on the discs from a hopper. A distributor disc 60 is illustrated in FIGS. 3, 4, and 5. The distributor disc 60 is positioned below the rotary composting drum 10 and suspended from the base frame 22 for rotary motion about a vertical axis. In this position, the distributor disc 60 intercepts composted material falling from the rotary composting drum 10. The distributor disc 60 is operatively connected to the wheel axle 28, for example by bevel gears 61, such that motion of the trailer 20 over the ground causes the distributor disc 60 to rotate. Any composted material falling on the distributor disc 60 is thereby thrown to every side for better distribution of the land applied material. Alternative broadcasting means are contemplated to be within the scope of the present invention. For example, instead of a solid disc, a rotating radial array of flexible fingers could be used to distribute the composted material. Other forms of broadcasting means know in the art would be acceptable in the practice of the present invention, including means deployed behind the trailer 20 to spread the composted material that has fallen on the ground from the drum 10.

The method of using the present invention is to transport the mobile composter one or more poultry houses, at each of which the poultry carcasses are loaded into the rotary composting drum 10. This is the only manual handling operation required with the present invention. After the rotary composting drum 10 is partially loaded to ⅔ or ¾ of full capacity, fertilizer may be added to enhance the composting process. The mobile composter may be parked at any suitable location for the composting action to be completed. During the composting process, which may take 30 days, the rotary composting drum is turned, manually or mechanically, every few days until the process is complete. No motorized turning is required but may be employed as desired. After composting is complete, the loaded mobile composter is taken to a field for spreading. At no time is there any requirement for loading or unloading the composter. The removable slats 31 are opened. The chain 40 is connected to the wheel axle 28 so that the drum 10 is turned by the movement of the wheels 21 over the ground. This tumbling action spreads the composted material as the trailer 20 is pulled over the field. Alternatively, if the mobile composter of the present invention is equipped with broadcasting means, such will assist in the distribution of the composted material.

In order to have the capacity to keep the composting process going continually and have the capacity to continue to receive carcasses as needed, it would be desirable to have several mobile composters in use simultaneously at different stages of the composting process. After the completion of the composting cycle in one trailer it would be taken to a field for spreading as described above. Alternatively, drums 10 may be mounted to stationary supports with means for transferring such drums 10 from the stationary support to a mobile trailer 20 such that a single mobile trailer 20 may be employed with multiple drums 10.

The present invention has been described with reference to certain preferred and alternative embodiments which are considered exemplary only and not limiting to the full scope of the invention as set forth in the appended claims.

What is claimed is:

1. A method for composting poultry carcasses and spreading compost derived from composted poultry carcasses employing a horizontal rotary drum composter mounted on a mobile open support frame having wheels and drive means releasably connected to the wheels for rotating the drum composter, comprising the steps of:

(a) transporting the rotary drum composter to the vicinity of one or more poultry house;

(b) loading the rotary drum composter with poultry carcasses until the rotary drum composter is full;

(c) adding fertilizer to the rotary drum composter;

(d) rotating the rotary drum composter at intervals until the composting action is complete;

(e) transporting the rotary drum composter to a field for spreading the composted poultry carcasses;

(f) connecting drive means between the wheels of the open support frame to the rotary drum composter whereby motion of the wheels of the support frame rotates the rotary drum composter;

(g) opening one or more openings in the rotary drum composter;

(h) transporting the support frame over the field thereby tumbling the composted poultry carcasses from the open door of the rotary drum composter.

* * * * *